June 13, 1961  R. GILMONT  2,988,321
FLUID FLOW CONTROL DEVICES
Filed April 4, 1955  2 Sheets-Sheet 1

INVENTOR
ROGER GILMONT
BY
A. A. Orlinger,
ATTORNEY

June 13, 1961 R. GILMONT 2,988,321
FLUID FLOW CONTROL DEVICES
Filed April 4, 1955 2 Sheets-Sheet 2
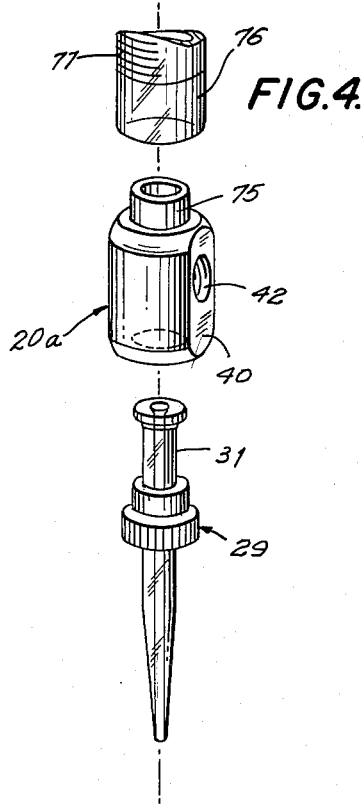
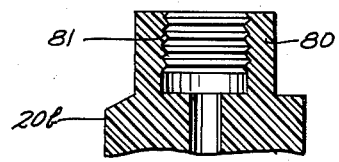
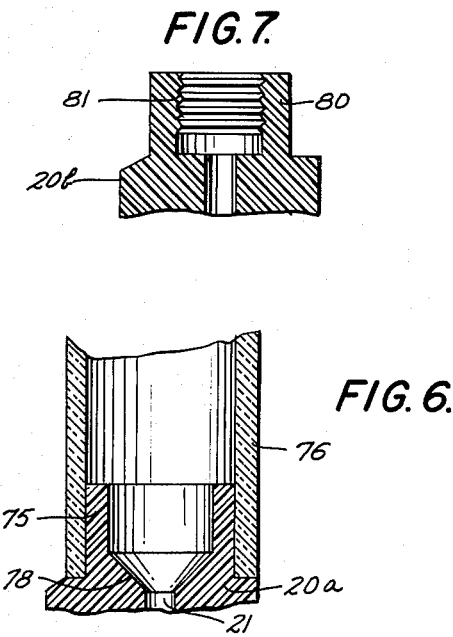
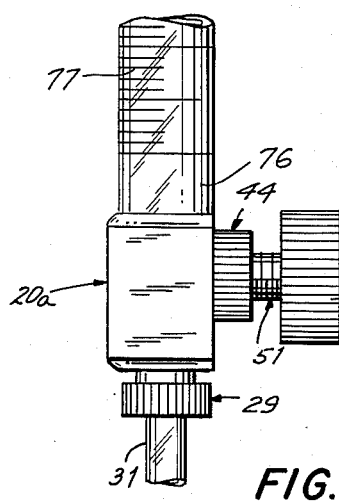
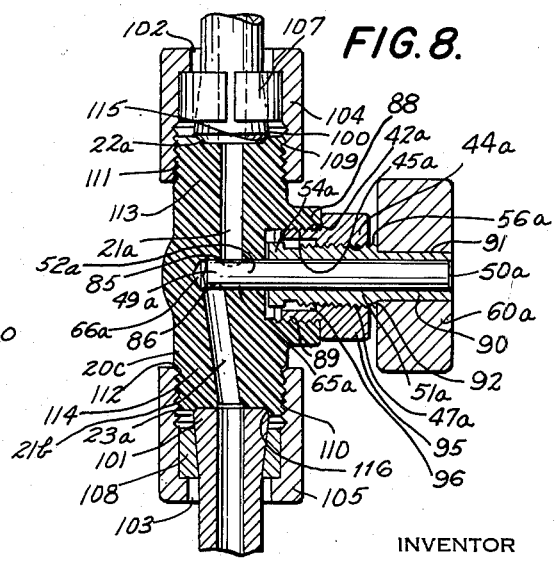
INVENTOR
ROGER GILMONT
BY
ATTORNEY //www.w3.org/1999/xhtml">
United States Patent Office 2,988,321
Patented June 13, 1961

2,988,321
FLUID FLOW CONTROL DEVICES
Roger Gilmont, Douglaston, N.Y., assignor to Manostat Corporation, New York, N.Y., a corporation of New York
Filed Apr. 4, 1955, Ser. No. 499,604
9 Claims. (Cl. 251—214)

This invention is that of a valve for controlling the flow of fluids, i.e. liquids or gases, that replaces the ordinary stop-cock, requires no gaskets and operates without the use of a lubricant. The valve of the invention operates much like a gate valve and at the same time provides the fine control of fluid flow obtained with a needle valve, and yet does not require pressure against a valve seat to close off flow of the fluid.

The ordinary stop-cock presents a number of disadvantages. Since it requires the use of a lubricant, there is always the problem of grease contamination. Then also, the difficulty with "frozen" stop-cock plugs and the concomitant danger of breakage, and the expense involved, is too well known. Moreover, its structure permits only limited control of flow.

These and other disadvantages are avoided by the valve of the invention. Considered broadly, this valve comprises a valve body of rigid plastic material that is resiliently yieldable and has a low coefficient of friction enabling a rigid object to be moved across it without the intervention of a lubricant; a longitudinal bore, or fluid passage, extending through it from a fluid inlet or entry port to an exit or outlet port; a valve stem (or closing plunger) bore extending transversely into the longitudinal bore and terminating in a valve stem tip stop indent in the wall of the longitudinal bore and co-axial with the valve stem bore; a valve stem (or rigid plunger) carried in the valve stem bore and adapted for axially longitudinal forward and retractable movement through it; and means for applying such motion to the valve stem. The valve stem and its bore advantageously are of circular cross-section for the stem to be rotated one way or the other to give it its forward or backward motion through the bore. The diameter of the valve stem or plunger is slightly greater than that of the bore, sufficient to permit the movement of the former through the latter. Thereby the rigid valve stem or plunger, after completely crossing the longitudinal bore or fluid passage, closes the latter by pressure of the peripheral surface of the plunger against its intersection with the fluid passage.

The plastic material of the valve body is firm and rigid yet sufficiently resiliently yieldable to enable the just described pressure to develop between it and the plunger by the differences in diameter between the latter and the bore through which it is moved, and to return to its original form when the pressure is released. This plastic material has the indicated low coefficient of friction in that it has a relatively smooth or slippery or wax-like surface. It is inert to water and many liquids and gases.

Presently, the most desirable plastic material for the valve body is the molded tetrafluoroethylene resin or polymer (i.e. polymerized tetrafluoroethylene) described in U.S. Patent 2,230,654 (Roy J. Plunkett) issued February 4, 1941 and commonly referred to by its trademark "Teflon." Other molded polyethylene (substituted or unsubstituted) polymers or resins, for example, halogenoethylene resins as other fluoroethylene resins such as the polymer of trifluoroethylene chloride known by its trademark "Kelef" can be used, as well as an unsubstituted non-adhesive polyethylene polymer such as polyethylene itself, or co-polymers of any of them, so long as they have the resiliently yieldable rigidity to return to the original size and shape after release of applied pressure and the sufficiently low enough coefficient of friction to enable the valve stem or plunger to be rotatably moved through the valve stem bore without the intervention of a lubricant and without catching or gripping. Thus, there can be used also the plastics that are impregnated with finely divided graphite or other inorganic lubricant such as copper powder, calcium fluoride, and molybdenum disulfide, or compatible mixtures of any of them, so long as the product taken is inert to the fluid that will be passed through the fluid passage of the valve body.

The "Teflon" molded tetrafluoroethylene resin has a wax-like feel and is odorless, tasteless, non-swelling, non-shrinkable and has no tendency to cold flow. It is inert to a wide variety of chemicals, for example, insoluble in, and unaffected by, hot or cold water, acetone, ether, petroleum ether, ethanol, iso-amyl alcohol, ethyl acetate, carbon tetrachloride, trifluoro-trichloroethane, dichlorobenzene, nitrobenzene, petroleum, pyridine, caustic soda solutions, glacial acetic acid, hydrochloric, hydrofluoric, sulfuric, and nitric acids, aqua regia, and non-reactive with chlorine or bromine or aqueous solutions of them, and other gases such as hydrogen chloride, sulfur dioxide and trioxide, nitrous and nitric oxides, nitrogen dioxide, and oxygen, and iodine vapor, and also ammonia.

The rigid valve stem can be of any suitable material, for example, glass (e.g. hard stem glass), synthetic ruby or sapphire, stainless steel, the same resin or plastic as the valve body, or hard rubber or other rigid plastic, in each case depending on its resistance to the fluid (gas or liquid) that is to be passed through the valve. It is advantageous for the valve stem or piston to be precision ground, and best within a tolerance of about two ten-thousandths of an inch, and for the valve stem or piston bore to be reamed with a highly polished rod, preferably steel, and within the same tolerance. The outside diameter of the valve stem or piston should be from about one to five thousandths, and preferably between about one and two thousandths, of an inch greater than the inside diameter of the valve stem bore.

The invention is not restricted to the valve alone, but embraces also systems that include it, for example, its combination in gas or liquid handling systems and devices such as macro-titration burets and micro-burets and other such liquid flow control devices. The various possible embodiments of the invention are equally suitably applicable to handling any fluid, either liquid, vapor or gas. However, since its greater use initially has been in liquid systems, for convenience the more detailed description below is made with relation to a liquid system.

The invention may be illustrated by, but not restricted to, the embodiments of it shown in the accompanying drawings wherein:

FIG. 4 is an expanded view showing a modification in the valve body of FIG. 1 with a boss adapted for insertion by friction fit into the lower end of a buret;

FIG. 5 is a side view of the assembled modification of FIG. 4;

FIG. 6 is a fragmentary vertical sectional view of the assembly of FIG. 5, showing the boss friction-fitted into the buret tube;

FIG. 7 is a fragmentary sectional view similar to that of FIG. 6, but showing a modification in one end of the valve body to permit connection to a tube selectively by friction fit or by retainer nut;

FIG. 8 is a longitudinally transverse sectional view through a further modification of the valve of the invention, with its connections to a fluid line.

Figure 1:
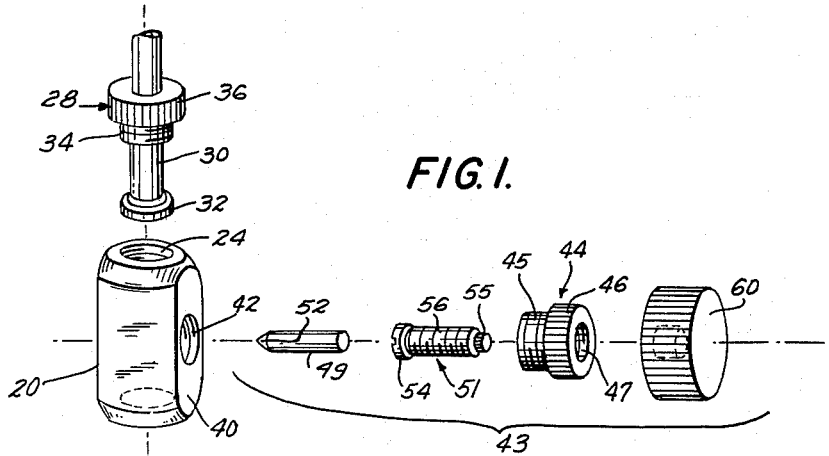
FIGURE 1 is an expanded view of one embodiment of the valve of the invention, in a form which permits its use in a fluid flow line as well as in a buret.

In the drawings (FIGS. 1, 3, 4 and 6), running longitudinally through the valve body 20 is a longitudinal bore 21. Each end of bore 21 is enlarged to provide, at the opposite ends of the valve body, line junction receivers 22 and 23 co-axial with bore 21 and each of them being open-ended and having its own internal threads 24 and 25 respectively, extending to a little short of the bottom of the receivers.

Separate retainer nuts 28 and 29, encircling liquid lines 30 and 31 respectively, are adapted to be moved axially longitudinally along them and restrained against being removed from them by the outwardly extending annular flanges 32 and 33 respectively. The outside diameter of these flanges is such as to enable them to be inserted past threads 24 and 25 in, and to the bottoms of, the junction receivers. The portion of each of the retainer nuts 28 and 29 nearer its flange has outside threads 34 and 35 respectively of dimensions to enable them to screw tightly into corresponding threads 24 and 25 in junction receivers 22 and 23. The other part of each of these two retainer nuts serves as their handles 36 and 37 respectively and advantageously is of somewhat larger outside diameter and knurled on its outer peripheral surface.

Extending from a flat face 40 on one side of valve body 20 partially toward the longitudinal bore 21 is the bearing nut receiving hole 41 tapped with inside threads 42.

The valve stem holding and operating assembly 43 includes a bearing nut or bushing 44 consisting of two parts advantageously of different outer diameters. The smaller diametered part has outside threads 45 of such root and crest dimensions and pitch to screw snugly in removably engaging registery with inside threads 42 in bearing nut receiver 41. The larger diametered part conveniently has knurling 46 on its outer peripheral surface. A longitudinal bore runs axially through bushing 44 and has inside threads 47 in the larger diametered portion. The other portion of that bore has merely a smooth face and diameter advantageously somewhat slightly greater than that across the root of threads 47.

Valve stem (or piston) 49 is frictionally fitted co-axially into stem holder bore 50 in stem holder 51, with the conically tipped closing end 52 of stem 49 extending outwardly a short distance from an open end of the stem holder bore.

Except for the short annular flange 54 at its end near the exposed stem tip 52 and a knurled turning head 55 at its other end, stem holder 51 has along its outer peripheral surface outside threads 56 of such root and crest diameters and pitch to enable it to thread in registry along the inside threads 47 in bushing 44 for axially longitudinal to and fro movement in relation to it. Valve stem holder flange 54 has such outer diameter to be able to pass axially longitudinally through the smooth inner bored end 48 of this bushing and to be stopped at the beginning of the inside threads 47 of bushing 44 at their junction with the smooth bore portion 48. The outside diameter of knurled turning head 55 advantageously is less than that of the root of outside threads 56. A slot 57 runs diametrically across the outer end face of flange 54.

Valve stem holding and operating assembly 43 is completed with hand wheel 60. Co-axially in the latter is located its bore 61 having inside threads 62 of such root and crest diameters and pitch to screw on in registry, and hold in friction fit, along outside threads 56 of stem holder 51. Threads 62 may run the entire depth of hand wheel bore 61, but preferably terminate at a lesser depth sufficient to let stem holder 51 be thread-friction-fitted into them until the outer end surface of stem holder turning head 55 contacts the bottom of bore 61.

From the bottom of bearing nut receiver hole 41, valve stem inlet 65 extends co-axially with it into liquid passage or longitudinal bore 21 and transversely to its axis and aims diametrically oppositely across to valve stem stop indent 66 shaped to conform to the conical tip of valve stem 49. The latter need not always terminate in a conical tip but may end entirely flat across or in any other shape whose cross-section does not extend beyond the peripheral cross-section of valve stem 49.

Valve stem 49 should be precision ground, advantageously to a tolerance of about two ten-thousandths of an inch, and its outside diameter should be slightly greater than the inside diameter of valve stem inlet 65 and the diameter of the junction of stem stop indent 66 with longitudinal bore 21, so as to give interference within the range from about one to five thousandths, and usually about three thousandths, of an inch difference in diameter.

Figure 2:
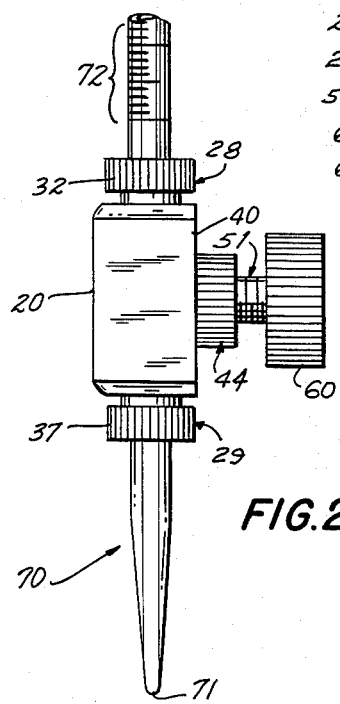
FIG. 2 is a side view of the valve shown in FIG. 1, assembled and connected with a micro-buret tube and buret tip.

The valve included in the invention, instead of serving to control liquid flow in a line in which flowing liquids are confined, can replace the usual stop-cock which forms a part of a titration buret. Thus, the invention includes such burets having in place of the stop-cock a valve of the invention. One such buret suitable for micro-titration is illustrated by FIGURE 2. In it, the outflow liquid line 31 of the embodiment of FIG. 1 is replaced by a buret tip 70 that terminates at its outer or lower end with a relatively fine drop outlet 71. The other liquid line 30 fitting into inlet port 22 of valve body 20 is replaced by a buret tube terminating with the same type of junction flange 32 and having the usual micro-buret volume graduations 72 along its length.

The invention embraces also another form of buret used for the ordinary macro-titrations, and including the valve of the invention. This type of buret, except for the difference in size of the graduated tube and possibly also of the outlet tube, can have the same construction as shown in FIG. 2. On the other hand, both burets can have a different type of connection between the graduate tube and, for example, the inlet port end of the valve body. Such modification is shown in FIGURES 4, 5 and 6. There, in place of internally threaded inlet port 22 and the junction 30 and flange 32 (of FIGURES 1 and 3), from the upper end of valve body 20a a cylindrical boss 75 extends upwardly, and over its outside surface, there is frictionally fitted the lower end of the buret tube 76 (bearing the usual volume graduations 77).

The outside diameter of boss 75 should be sufficiently greater than the inside diameter of the overlapping end of buret tube 76 to enable the two to overlap and to prevent fluid leakage. It is advantageous for the outside vertical surface of boss 75 to be coined with a precision reamed and polished tube of the necessary diameter, and to be from about one to about five, and preferably to about two, thousandths of an inch greater than the inside diameter of the bottom of the buret tube. Thus, the buret tube can be of the readily available precision tubing prepared in known manner by shrinking on a heated polished mandrel. The difference in inside diameter between boss 75 and liquid passage 21 in valve body 20 is adjusted by the inverted frusto-conical portion of valve body 20 connecting the interior of boss 75 with longitudinal passage 21 (FIGURE 6).

The valve body modification illustrated in FIGURE 7 permits selective connection of a liquid line by either friction fit over the outer surface of a boss 80 (similarly to that described as to the modification shown in FIGURES 4, 5 and 6), or by inserting the outwardly extending junction flange of a liquid line into, and below the inside threads 81 of, the boss 80, and then screwing the outside threads of a retainer nut in frictional fit longitudinally along inside threads 81 in boss 80 (similarly to that done with the modification in FIGURES 1, 2 and 3).

In the further modification of the valve shown in FIGURE 8, the longitudinal bore or liquid passage in its valve body 20c has two portions. One portion 21a runs co-axially from inlet port 22a to its inner end 85 at the point where it is shut off or opened by the moving across it or away from it of the valve stem 49a. The inner end 86 of the other portion 21b of the longitudinal bore is offset from the inner end 85 of the first portion 21a and is inclined so that its outer end at the outlet port 23a is co-axial with the outer end of the portion 21a at the inlet port 22a. Such co-axial location of the outer ends of the liquid passage may be helpful or desirable in some instances, but may not be essential in all cases.

Instead of the flat face 40 of the valve body 20 of FIGURES 1 through 6, the modification of FIGURE 8 has a valve stem assembly anchoring boss 88 extending outwardly to one side of valve body 20c and co-axially with the valve stem inlet 65a and the valve stem stop indent 66a. Outside threads 45a on the smaller diametered portion 89 of bearing bushing 44a are frictionally-fitted removably threaded into inside threads 42a of anchoring boss 88.

Valve stem 49a is frictionally force-fitted through stem holder bore 50a of stem holder 51a. Hand-wheel 60a is removably fixedly mounted on the outer end of stem holder 51a by force-fitted insertion of the outer end 90 of the latter into the force fit bore of hand-wheel 60a to an annular shoulder 92 intermediate the ends of stem holder 51a. The pressure provoked by the force fit attachment of hand-wheel 60a on the outer portion 90 of stem holder 51a enhances the force fit of the portion of the valve stem that extends into the outer portion 90 of stem holder 51a.

Just as in the modification of FIGURES 1 through 6, the conically-ended closing extension 52a beyond the free end of stem holder 51a is of such length to at least completely close off the inner end 85 of portion 21a of the liquid passage, but can be long enough to cover at least part of inner end 86 of the portion 21b of that passage, when the outer face of the free end of stem holder 51a meets the bottom of the inside of boss 88. Outside threads 56a running along the outside cylindrical surface of stem holder 51a from its shoulder 92 to short of its inner end engage in registry with inside threads 47a of corresponding root and crest diameters and pitch of the larger diametered portion 95 of bushing 44a.

The inside diameter of the smaller diametered portion of this bushing 44a is slightly greater than the crest diameter of the threads on the stem holder 51a. Outwardly annular flange 54a at the free end of stem holder 51a has an intermediate outside diameter so that as the stem holder is withdrawn on turning the hand-wheel in the proper direction, flange 54a will clear the bore in the smaller portion of bushing 44a and arrest the withdrawal on meeting the shoulder 96 at the junction of both portions of bearing bushing 44a.

For connecting the liquid confining lines running to and from valve body 20c, each of them has one of the outwardly flared junction portions 100 and 101 respectively, inserted through central openings 102 and 103 in the tops of the engaging nuts 104 and 105 respectively, and far enough for a separate one of split rings 107 and 108 to be slipped over each of the flared junctions 100 and 101. Nuts 104 and 105 are then advanced over the split rings and the inside threads 109 and 110 of the nuts are screwed over outside threads 111 and 112 respectively, of corresponding root and crest diameters and pitch, on the opposite ends 113 and 114 of valve body 20c to draw the flared junctions 100 and 101 into recesses 115 and 116 in it.

Instead of having at the inlet port the just described type of connection to the liquid confining line or conduit, this modification of the valve also can have an outwardly extending boss such as is described in relation to, and illustrated in, FIGURES 4 through 7, for insertion by friction fit into the lower end of a buret tube or other liquid conduit.

When the liquid conduit connected to the inlet port by any of the indicated types of connection is a buret tube, a buret tip is used as the liquid confining line or conduit connected to the outlet or exit port. It is also possible in this modification, as well as in any of the others, to replace the already indicated type of connection at the exit port to the buret tip especially, and even to any other liquid conduit, by a depending boss (considering the valve positioned for flow downwardly through it) to be inserted by friction fit into the top of the buret tip or other liquid conduit.

The boss and friction fit insertion type of connection has already been found in gas lines to be operable without leakage at working pressures up to thirty pounds per square inch. For such results it is always advantageous for any glass line that is to be connected to such boss to be of the precision type and for the boss to be coined and to have an outside diameter from about one to five thousandths of an inch greater than that of the inside diameter of the glass tubing.

While the various illustrated modifications show the opposite ends of the fluid passage of the valve as co-axial with one another, that is not necessary in all cases, so long as the proper relationship exists between the fluid passage and the valve closing stem and its inlet.

The method of assembly of the different parts of the valve may be obvious from the foregoing description of its various modifications. Briefly, the valve closing stem is removably but fixedly inserted by friction fit into the flanged end of the stem holder and with sufficient of the stem exposed to enable it to move axially longitudinally through its inlet in the valve body for its end to cross the liquid conduit and close it. The other end of the stem holder is inserted into the end of the anchoring bushing or bearing nut that has the outside threads and is screwed through it until a sufficient length of the outside threads on the stem holder are exposed at the other end of the bearing nut to enable the hand-wheel to be screwed (in the modification other than of FIGURE 8) on to that end of the stem holder. The outer threaded end of the bearing nut is then screwed into the threaded bore provided in the valve body for receiving it. The hand-wheel is rotated in one direction to direct the closing valve into its position to close off the liquid passage, and in the opposite direction to open that passage.

When the valve needs to be disassembled, the reverse of the above described procedure is followed. If there is difficulty in loosening the stem holder from the bearing nut, a screw driver can be used in the slot in the outer end of the flanged end of the stem holder.

With the valve body of the "Teflon" polytetrafluoroethylene resin, the valve can handle fluids over a range of temperature from about minus one hundred up to five hundred degrees Fahrenheit.

Figure 3:
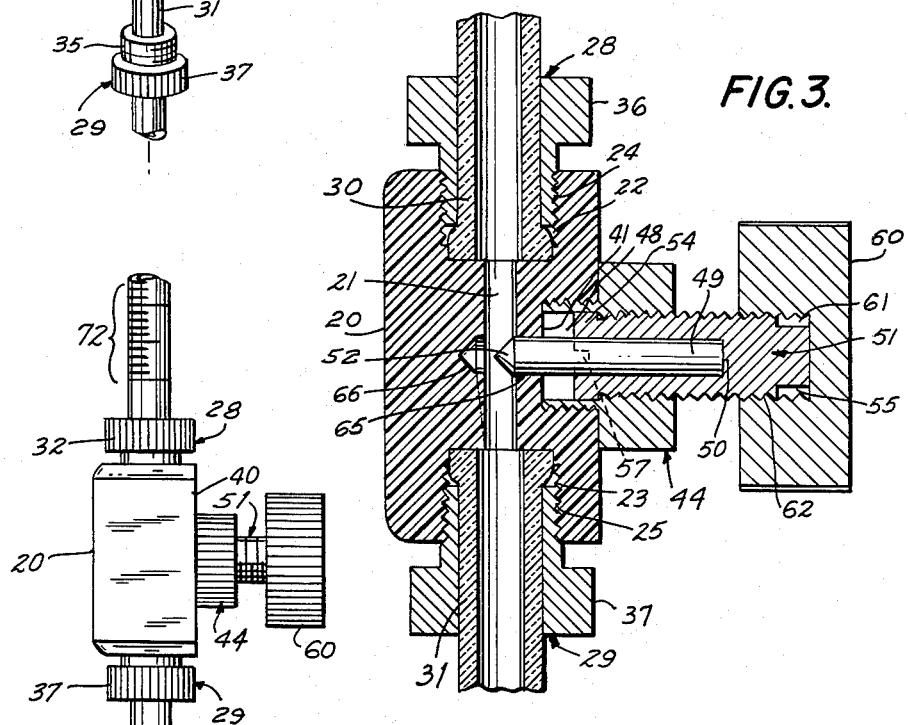
FIG. 3 is a vertical transverse sectional view of the valve and its connection as in FIG. 2.

In some instances with liquids of too high viscosity when the depth of the plunger tip stop indent in the form shown in FIGURE 3 at 66 is too great, too much liquid may be entrapped in it by the tip of the plunger and thus present some resistance to adequate entry of that tip into the indent. This is relieved by reducing the depth of the indent to a minimum. It also is avoided completely by inclining at least the nearer wall of the lower part of the liquid passage to the base of the stop indent as indicated by the broken line in FIGURE 3. Alternatively, the lower part of the liquid passage can be offset from the upper as shown in the modification of FIGURE 8.

The features of the valve of the invention are not restricted to a two-way form as seen in the drawings. They can be incorporated in other multi-way valves.

In any of its modifications, the valve body and the valve closing stem can be made from any of the various materials already indicated for them. The other parts of the valve can be made of any other suitable material. For many applications of the valve these other parts can be made of any suitable, rigid, non-yieldable plastic suitable for the operating environment in which the valve is to be used. No gaskets are necessary at any of the connections to the valve body.

The valve of the invention incorporated in a buret provides faster and more accurate control of the titration rate and an extensive range of use embracing both the ordinary macro-titration as well as micro-titration. The area across the liquid flow passage in the valve body can be reduced at any suitable or desired point in the progress of the titration by turning the hand-wheel in the necessary direction to reduce the exit flow rate to a point where merely no more, or even less, than a half turn of the hand-wheel will shut off the flow.

In the micro-burets now in use, for fine micro-work in the range of five cubic centimeters or less, a very fine orifice tip is required. No such fine tip is needed with the buret of the invention, for in it with a valve of the invention, a larger orifice (even one suitable for macro-titration) can be used.

While the invention has been illustrated by detailed description of certain specific embodiments of it, it is understood that various suitable modifications and substitutions can be made in any of them within the scope of the appended claims which are intended also to include equivalents of any of these specific embodiments.

What is claimed is:

1. A valve applicable to effect the flow of fluids, which valve comprises a valve body of rigid yet resiliently yieldable plastic material having a coefficient of friction low enough to enable repeated to and fro movement of a firmly held rigid object across it without the application of a film of lubricant between them, a fluid passage running through a such resiliently yieldable portion of the valve body and connecting at one of its ends with an inlet port and at the other with an outlet port, a rigid fluid passage closing stem, an opening in an outer wall of the body intermediate the ports for anchoring holding and operating means for said closing stem, a closing stem orifice connecting the anchoring opening and the fluid passage and running through a resiliently yieldable portion of the valve body at an angle transverse to the axis of the passage, and holding and operating means for the closing stem removably fitted into the anchoring opening, the closing stem being rigid and cylindrical and having such outside diameter relative to the inside diameter of said orifice for said closing stem to be held in fluid-tight and peripherally sliding engagement in said orifice without a film of lubricant between them and being capable of peripherally sliding movement without any lubricant to and fro co-axially in said orifice whereby the inner end of the closing stem can be moved transversely across the fluid passage to block it simply by fluid-tight contact of the peripheral surface of the closing stem against its transverse intersection with the fluid passage and thereby without deformation of the closing stem, shut off fluid flow through said passage.

2. A valve as claimed in claim 1, wherein the valve body is a molded polyethylene resin.

3. A valve as claimed in claim 2, wherein the valve body is polyethylene.

4. A valve as claimed in claim 2, wherein the valve body is a fluoroethylene resin.

5. A valve as claimed in claim 4, wherein the valve body is the polytetrafluoroethylene resin known by the trade-mark "Teflon."

6. A valve as claimed in claim 1, wherein the outside diameter of the closing stem is greater than the inside diameter of the fluid passage at least at the location where the closing stem intersects that passage.

7. A valve as claimed in claim 6, wherein the outside diameter of the valve stem exceeds the inside diameter of the intersection of the liquid passage and the valve stem orifice by from about one to about five one-thousandths of an inch.

8. A valve as claimed in claim 1, wherein there is a recess in the wall of the valve body and which is connected with the fluid passage and positioned opposite its junction with the closing stem orifice and co-axial with the prolongation of its axis, to receive the inner end of the closing stem and having such cross-section as to give a fluid-tight fit with that end of the closing stem.

9. For a valve applicable to effect the flow of fluids, a valve body comprising rigid yet resiliently yieldable plastic material having a coefficient of friction low enough to enable repeated to and fro movement of a firmly held rigid object across it without the application of any lubricant between them, a fluid passage running through a such resiliently yieldable portion of the valve body and connecting at one of its ends with an inlet port and at the other with an outlet port, an opening in an outer wall of the body intermediate the ports for anchoring holding and operating means for a closing stem, a closing stem orifice connecting the anchoring opening and the fluid passage and running through a resiliently yieldable portion of the valve body at an angle transverse to the axis of the passage, said orifice being cylindrical and of such internal diameter to receive a rigid and cylindrical closing stem in fluid-tight and sliding engagement and without any lubricant between said stem and said orifice to allow the stem to have sliding movement without any lubricant to and fro co-axially in said orifice whereby the inner end of the closing stem can be moved transversely across the fluid passage to block it by fluid-tight contact of the peripheral surface of the closing stem against its transverse intersection with the fluid passage and thereby, without deformation of the closing stem, shut off fluid flow through said passage.

References Cited in the file of this patent

UNITED STATES PATENTS

| | | |
|---|---|---|
| 351,828 | Bushnell | Nov. 2, 1886 |
| 1,895,636 | McKaig | Jan. 31, 1933 |
| 2,181,059 | Lee | Nov. 21, 1939 |
| 2,250,517 | Zolleis | July 29, 1941 |
| 2,617,171 | Kimmel | Nov. 11, 1952 |
| 2,661,019 | Snyder | Dec. 1, 1953 |
| 2,675,204 | Johnson | Apr. 13, 1954 |
| 2,805,040 | Voss | Sept. 3, 1957 |

FOREIGN PATENTS

| | | |
|---|---|---|
| 361,262 | France | of 1906 |
| 527,074 | France | of 1921 |
| 362,953 | Great Britain | of 1931 |
| 451,745 | Italy | of 1949 |

OTHER REFERENCES

"Teflon Makes Its Debut"; Plastics Magazine, July 1946 (pp. 32–34, 97), Ziff-Davis; Chicago, Ill.

Industrial-Engineering Chemistry Magazine; vol. 38–1946 (pp. 871–877) (TP-1-A58), American Chemical Society, 1155 16th St. NW., Washington, D.C.

Pulp & Paper Magazine of Canada, December 1950, page 27.